US010358595B2

(12) United States Patent
McDaniel et al.

(10) Patent No.: US 10,358,595 B2
(45) Date of Patent: Jul. 23, 2019

(54) METHODS OF PRODUCING PARTICLES HAVING TWO DIFFERENT PROPERTIES

(71) Applicant: Halliburton Energy Services, Inc., Houston, TX (US)

(72) Inventors: Cato Russell McDaniel, The Woodlands, TX (US); Dale E. Jamison, Humble, TX (US); Kenneth W. Pober, Houston, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 15/310,730

(22) PCT Filed: Jun. 5, 2014

(86) PCT No.: PCT/US2014/041145
§ 371 (c)(1),
(2) Date: Nov. 11, 2016

(87) PCT Pub. No.: WO2015/187168
PCT Pub. Date: Dec. 10, 2015

(65) Prior Publication Data
US 2017/0073574 A1 Mar. 16, 2017

(51) Int. Cl.
*C09K 8/70* (2006.01)
*E21B 43/267* (2006.01)
*C09K 8/03* (2006.01)
*C09K 8/80* (2006.01)
*C09K 8/92* (2006.01)
*C09K 8/40* (2006.01)
*C09K 8/42* (2006.01)
*C09K 8/72* (2006.01)
*E21B 43/16* (2006.01)
*E21B 21/00* (2006.01)
*E21B 33/13* (2006.01)
*E21B 43/26* (2006.01)

(52) U.S. Cl.
CPC .............. *C09K 8/70* (2013.01); *C09K 8/03* (2013.01); *C09K 8/40* (2013.01); *C09K 8/42* (2013.01); *C09K 8/72* (2013.01); *C09K 8/805* (2013.01); *C09K 8/92* (2013.01); *E21B 43/16* (2013.01); *E21B 43/267* (2013.01); *C09K 2208/08* (2013.01); *C09K 2208/10* (2013.01); *E21B 21/00* (2013.01); *E21B 33/13* (2013.01); *E21B 43/26* (2013.01)

(58) Field of Classification Search
CPC ... C09K 8/70; C09K 8/72; C09K 8/40; C09K 8/42; C09K 8/03; C09K 8/92; C09K 8/805; C09K 2208/10; C09K 2208/08; E21B 43/16; E21B 43/267; E21B 21/00; E21B 33/13; E21B 43/26
USPC ...................................... 166/305.1
See application file for complete search history.

(56) References Cited

U.S. PATENT DOCUMENTS

| 4,506,734 A | 3/1985 | Nolte |
| 4,711,784 A | 12/1987 | Yang |
| 4,741,401 A | 5/1988 | Walles et al. |
| 6,508,305 B1 | 1/2003 | Brannon et al. |
| 2005/0194141 A1* | 9/2005 | Sinclair ............ C09K 8/805 166/280.2 |
| 2014/0087974 A1* | 3/2014 | Villarreal ............ C09K 8/03 507/110 |
| 2014/0135237 A1 | 5/2014 | Villarreal et al. |

FOREIGN PATENT DOCUMENTS

WO 2005017313 A1 2/2005
WO 2013126219 A1 8/2013

OTHER PUBLICATIONS

Australian Examination Report dated Mar. 8, 2017; Australian Application No. 2014396174.
Hong, et al., "Simple Method to Produce Janus Colloidal Particles in Large Quantity", Langmuir, 2006, vol. 22, pp. 9495-9499.
Lee, et al. "Janus-Core and Shell Microfibers", Langmuir, 2013, vol. 29, pp. 6181-6186.
International Search Report and Written Opinion dated Feb. 5, 2015; International PCT Application No. PCT/US2014/041145.

* cited by examiner

*Primary Examiner* — William D Hutton, Jr.
*Assistant Examiner* — Ashish K Varma
(74) *Attorney, Agent, or Firm* — McGuireWoods LLP

(57) ABSTRACT

A method of producing particles comprising: (A) providing a plurality of particle cores, wherein the cores have at least a first property; (B) partially or fully coating the outer surface of the cores with a substance, wherein the substance has a second property, and wherein the second property is different from the first property; and (C) reducing the particle size of the coated particles, wherein the core is exposed after the step of reducing. A method of using particles comprising: introducing a treatment fluid into an area to be treated, wherein the treatment fluid comprises: (i) a base fluid; and (ii) the particles.

28 Claims, No Drawings

METHODS OF PRODUCING PARTICLES HAVING TWO DIFFERENT PROPERTIES

TECHNICAL FIELD

Janus particles can be used as an additive in a fluid. Janus particles are particles having at least two different properties. Methods of producing Janus particles are provided. According to certain embodiments, the particles are used in oil or gas operations.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more properties etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase.

Additives are commonly included in fluids for a variety of industries. Such industries include oil and gas exploration and development, waste management, refining, chemical manufacture, and chemical formulation. Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid. A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

The additives can be in the form of an insoluble particle in a base or carrier fluid. Each additive can have its own individual properties. A Janus particle can be used as an additive. A Janus particle is unique in the sense that it possesses at least two distinct properties. For example, a Janus particle can include a region having a positive charge and another region having a negative charge. Other properties can include oil/water wettability, hydrophobic/hydrophilic, and polar/non-polar. The use of Janus particles can be advantageous due to the ability of the particles to provide the at least two distinct properties in the single type of particles. This obviates the need for different types of particles, wherein each type of particle only has one distinct property. Accordingly, costs can be decreased and the total amount of particles included in a base fluid can be reduced.

There are a variety of methods of making Janus particles. One method is called masking. Masking involves taping off or masking one side of the particle, modifying the unmasked side to provide a second property, and then removing the masking. Current methods can have limitations, such as it can be very cumbersome to make the Janus particles, which leads to an increased cost of manufacture; the shape of the particles that can be used may be very limited; and it may not be possible to easily or effectively vary the concentration of the different properties of the particles.

Thus, there is an on-going need for improved methods of preparing Janus particles. It has been discovered that Janus particles can be coated and then ground to expose the inner core of the particle. The process allows a variety of different shaped particles to be used, is more efficient, less expensive, and less cumbersome than previous methods.

According to an embodiment, a method of producing particles comprises: (A) providing a plurality of particle cores, wherein the cores have at least a first property; (B) partially or fully coating the outer surface of the cores with a substance, wherein the substance has a second property, and wherein the second property is different from the first property; and (C) reducing the particle size of the coated particles, wherein the core is exposed after the step of reducing.

According to an embodiment, a method of producing particles comprises: (A) providing a plurality of particle cores, wherein the cores have at least a first property; (B) providing a modified surface of the cores, wherein the surface has a second property, and wherein the second property is different from the first property; and (C) reducing the particle size of the particles, wherein the core is exposed after the step of reducing.

According to another embodiment, a method of using particles comprises: introducing a treatment fluid into an area to be treated, wherein the treatment fluid comprises: (i) a base fluid; and (ii) the particles.

The discussion of preferred embodiments regarding the particles or any ingredient in the treatment fluid, is intended to apply to all of the method embodiments. Any reference to the unit "gallons" means U.S. gallons.

The methods include providing a plurality of particle cores. As used herein, the term "core" means the portion of an object that is in the largest quantity and are the particles prior to coating (in which the cores become the inside of the coated particles) or prior to modification of the surface. It is to be understood that the term "core" encompasses the central and middle and outer portions of the pre-coated or pre-modified particles and doesn't necessarily imply just a central portion. The cores can be made by a variety of processes. For example, the cores can be made via a precipitation reaction or extruded. A precipitation reaction results in the formation of an insoluble precipitate after mixing two different solutions together. The solubility of the resultant reaction products will determine whether a product will be insoluble and precipitate out of the mixture of solutions or remain soluble. As used herein, a product is considered insoluble and will form a precipitate if less than 0.01 moles dissolves in 1 liter of solvent at 77° F. (25° C.) and a pressure of 1 atmosphere. By way of example, a mixture of potassium iodide (KI) and lead nitrate (Pb(NO$_3$)$_2$) can form a reaction product of lead iodide (PbI$_2$), which is insoluble and will precipitate out of the solution.

The core can also be a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. In a copolymer, the repeating units from each of the monomer residues can be arranged in various manners along the polymer chain. For example, the repeating units can be random, alternating, periodic, or block. The cores can be a homopolymer or copolymer.

The cores of the particles can be made of a variety of compounds, such as metals, metal alloys, plastics, thermoplastics, ceramics, insoluble salts, oxides, composites, and any other insoluble materials. The cores have at least a first property. The cores can also have a third, fourth, and so on properties. The cores can comprise, for example, a matrix having a first property and one or more smaller particulates or fibers embedded within the matrix. The one or more particulates or fibers can have different properties than the first property of the matrix (e.g., a third, fourth, and so on properties). The inclusion of the particulates and/or fibers can be useful when it is desired to have more than two different properties of the particles.

The cores can also have a variety of shapes prior to reducing the particle size of the cores. By way of example, the cores can have a geometric shape, such as spherical, oblong, or oval, a rod-like shape, a plate-like shape, a fiber shape or other shapes. There can also be mixtures of different shapes. The shape of the cores can also be selected to provide a desired ratio or concentration of first property to second property (discussed in more detail below).

Prior to reducing, the particles can be bulk particles or mesoscopic particles. As used herein, a "bulk particle" is a particle having a particle size greater than 1 micron. As used herein, a "mesoscopic particle" is a particle having a particle size in the range of 1 micron to 0.1 micron. As used herein, the term "particle size" refers to the volume surface mean diameter ("D$_s$"), which is related to the specific surface area of the particle. The volume surface mean diameter may be defined by the following equation: $D_s = 6/(\Phi_s A_w \rho_p)$, where $\Phi_s$=sphericity; $A_w$=specific surface area; and $\rho_p$=particle density. The particle size can be selected such that the particles can be more easily coated. The particle size can also be selected to provide a desired ratio or concentration of the first and second properties (and any other properties that may also be included).

According to certain embodiments, the methods include providing a modified surface of the cores. The modified surface has a second property, wherein the second property is different from the first property. The surface can be chemically modified to create the second property. An example of chemically modifying the surface is oxidizing a silicon surface to create silicon dioxide and a polar second property.

According to other embodiments, the methods include partially or fully coating the outer surface of the cores with a substance, wherein the substance has a second property that is different from the first property. This difference in properties makes the particles Janus particles. Preferably, the entire outer surface is coated with the substance. More preferably, the outer surfaces of the cores are not masked prior to coating. This helps to reduce the time and cost involved with the coating process and leads to a less cumbersome system. The substance can be coated onto the outer surfaces via a variety of techniques known to those of ordinary skill in the art, such as spray coating, chemical precipitation, chemical deposition, crystallization, adsorption, and chemically bonding. According to certain embodiments, the substance can chemically interact with the surface of the cores and bond with the outer surface. An example of this is bonding a $C_{18}$ group onto the surface to create a non-polar second property. According to certain other embodiments, a bonding layer can be applied to the outer surface of the cores prior to coating with the substance. The bonding layer can act as an intermediary layer between the core and the coating and can help the substance maintain a good bond with the core.

The first and second properties (and any other properties) can be related to positive, negative and/or neutral charges; oil and water-wettability or wettability strengths; hydrophobicity and hydrophilicity; polar, intermediate polar and/or non-polar or polarity strengths. By way of example, the cores can include a matrix that has an intermediate polarity, one or more fibers distributed throughout the matrix that have a strong polarity, and a coating having a strong to moderately-strong non-polarity. The shape and size of the cores prior to coating can influence the ratio or concentration of the different properties. By way of example, the greater the core particle size, the higher the concentration of the first property compared to the second property. Moreover, a rod-like shaped particle may have a greater concentration of the first property compared to the second property. Furthermore, if the cores contain one or more particulates and/or fibers, then the concentration of the particulates and/or fibers can be adjusted to provide the desired concentration of the first, second, third, and so on properties.

The methods also include reducing the particle size of the cores. The particle size can be reduced using a variety of techniques including, but not limited to, shearing, grinding, milling, etc. After reduction in particle size, the particles can be bulk, mesoscopic, or nanoparticles. As used herein, a "nanoparticle" is a particle having a particle size of less than 0.1 micron. After the reduction in particle size, the inner core of the coated particles is exposed. As the shearing, grinding, or milling continues, more and more of the outer surface of the particles becomes the core as opposed to the coating. Accordingly, the amount of shearing, grinding, or milling can be adjusted to provide a desired ratio or concentration of the first (and optionally the third, fourth, and so on) and second properties. For example, less shearing provides a higher concentration of the second property per particle compared to more shearing. According to certain embodiments, the amount of shearing, grinding, or milling is limited such that the particles do not have an overwhelming (i.e., greater than about 90% of the outer surface area) concentration of the first property compared to the second property.

Certain methods provide for using the particles to treat an area. The particles are included in a treatment fluid. The treatment fluid includes a base fluid. As used herein a "base fluid" is a liquid that is in the greatest quantity of the treatment fluid and can be the solvent of a solution or the external phase of a heterogeneous fluid. The treatment fluid can be, for example, a slurry, an emulsion, or an invert emulsion. The particles can be dispersible in the base fluid or in any phase of an emulsion or invert emulsion base fluid. The base fluid can be an aqueous liquid, an aqueous miscible liquid, or a hydrocarbon liquid. Suitable aqueous-based fluids can include, but are not limited to, fresh water; saltwater (e.g., water containing one or more water-soluble salts dissolved therein); brine (e.g., saturated salt water); seawater; and any combination thereof. Suitable aqueous-miscible fluids can include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® an isoalkane and n-alkane; BIO-BASE 300™ a linear alkane; BIO-BASE 560® a blend containing greater than 90% linear alkanes; and ESCAID 110™ a mineral oil blend of mainly alkanes and cyclic alkanes. The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include ENCORE® drilling fluid and ACCOLADE® internal olefin and ester blend drilling fluid, marketed by Halliburton Energy Services, Inc. An example of a diesel oil-based drilling fluid is INVERMUL®, marketed by Halliburton Energy Services, Inc.

The treatment fluid can be used in a variety of industries. According to certain embodiments, the treatment fluid is used in an oil or gas operation. According to these embodiments, the treatment fluid can be a drilling fluid, cement composition, spacer fluid, completion fluid, fracturing fluid, or acidizing fluid. By way of example, the particles can be used as an emulsion or invert emulsion stabilizer, wherein the first and second properties can be hydrophobicity/hydrophilicity. The particles can be used to create a Pickering emulsion or invert emulsion. A Pickering emulsion is an emulsion that is stabilized via solid particles instead of another liquid. A solid particle used as an emulsion stabilizer can have improved performance over other additives commonly used as emulsion stabilizers. For example, the particles used for this purpose can have a higher thermal stability compared to other additives, emulsifiers, or surfactants.

The treatment fluid is introduced into an area to be treated. The area to be treated can be a portion of a subterranean formation or a wellbore. The treatment fluid can be introduced into a well using a pump. The well can be an oil, gas, water, or injection well. The subterranean formation can include an annulus. The step of introducing the treatment fluid can include introducing the fluid into a portion of the annulus.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of using particles comprising:
   introducing a treatment fluid into an area to be treated, wherein the treatment fluid comprises:
   (i) a base fluid; and
   (ii) a plurality of particles, wherein the plurality of particles comprises individual Janus particles, wherein the Janus particles comprise distinct first and second properties simultaneously; wherein the Janus particles are insoluble in the base fluid, wherein the Janus comprise:
      (a) particle cores, wherein the cores have at least the first property;
      (b) a coating around the outer surface of the cores or a modified surface of the cores, wherein the coating or surface has the second property, and wherein the second property is different from the first property, wherein the cores are exposed via grinding of the particles after coating or modification; wherein the first and second properties are selective from the group consisting of positive, negative and/or neutral charges; oil and water-wettability; wettability strengths; hydrophobicity and hydrophilicity; polar, intermediate polar and/or non-polar; polarity strengths; and any combination thereof;
   wherein the Janus particles comprise the distinct first and second properties prior to and during the introducing a treatment fluid into an area to be treated.

2. The method according to claim 1, wherein the treatment fluid is a slurry, an emulsion, or an invert emulsion.

3. The method according to claim 1, wherein the base fluid is an aqueous liquid, an aqueous miscible liquid, or a hydrocarbon liquid.

4. The method according to claim 3, wherein the aqueous liquid is selected from the group consisting of fresh water; saltwater; brine; seawater; and any combination thereof.

5. The method according to claim 3, wherein the aqueous-miscible liquid is selected from the group consisting of alcohols; glycerins; glycols; polyglycol amines; polyols; any derivative thereof; any in combination with salts; any in combination with an aqueous-based fluid; and any combination thereof.

6. The method according to claim 3, wherein the hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

7. The method according to claim 1, wherein the treatment fluid is used in an oil or gas operation, and wherein the treatment fluid is a drilling fluid, cement composition, spacer fluid, completion fluid, fracturing fluid, or acidizing fluid.

8. The method according to claim 1, wherein the treatment fluid is mixed with a mixing apparatus prior to the step of introducing.

9. The method according to claim 1, wherein the step of introducing comprises pumping the treatment fluid into the area to be treated using a pump.

10. A method of producing particles comprising:
    (A) providing a plurality of particle cores, wherein the cores have at least a first property;
    (B) partially or fully coating the outer surface of the cores with a substance, wherein the substance has a second property, and wherein the second property is different from the first property; wherein the first and second properties are selected from the group consisting of positive, negative and/or neutral charges; oil and water-wettability; wettability strengths; hydrophobicity and hydrophilicity; polar, intermediate polar and/or non-polar; polarity strengths; and any combination thereof;
    (C) reducing the particle size of the coated particles, wherein the core is exposed via shearing, grinding, or milling to provide a Janus particle; wherein the Janus particle comprises the distinct first and second properties simultaneously; and
    (D) introducing the Janus particles to a base fluid, wherein the Janus particles are insoluble in the base fluid; wherein the Janus particle comprises the distinct first and second properties prior to and during the introducing the Janus particle to the base fluid.

11. The method according to claim 10, wherein the cores are made via a precipitation reaction or extruded.

12. The method according to claim 10, wherein the cores are a polymer.

13. The method according to claim 10, wherein the cores are composed of metals, metal alloys, plastics, thermoplastics, ceramics, insoluble salts, oxides, composites, and any other insoluble materials.

14. The method according to claim 10, wherein the cores comprise a matrix having the first property and one or more particulates or fibers embedded within the matrix.

15. The method according to claim 14, wherein the one or more particulates or fibers have a third property, and wherein the third property is different from the first property of the matrix and the second property of the coating.

16. The method according to claim 10, wherein the cores have a shape selected from the group consisting of a geometric shape, including spherical, oblong, or oval; a rod-like shape; a plate-like shape; a fiber shape; or combinations thereof.

17. The method according to claim 10, wherein prior to the step of coating, the particles are bulk particles or mesoscopic particles.

18. The method according to claim 10, wherein the substance chemically interacts and bonds with the outer surface of the cores.

19. The method according to claim 10, further comprising a bonding layer, wherein the bonding layer is applied to the outer surface of the cores prior to the step of coating.

20. The method according to claim 10, wherein after the step of reducing, the particles are bulk, mesoscopic, or nanoparticles.

21. The method according to claim 10, wherein the particle size of the coated particles is reduced via shearing, grinding, or milling.

22. The method according to claim 21, wherein the amount of shearing, grinding, or milling is adjusted to provide a desired ratio or concentration of the first and second properties.

23. A method of producing particles comprising:
(A) providing a plurality of particle cores, wherein the cores have at least a first property;
(B) providing a modified surface of the cores, wherein the surface has a second property, and wherein the second property is different from the first property; wherein the first and second properties are selected from the group consisting of positive, negative and/or neutral charges; oil and water-wettability; wettability strengths; hydrophobicity and hydrophilicity; polar, intermediate polar and/or non-polar; polarity strengths; and any combination thereof;
(C) reducing the particle size of the particles, wherein the core is exposed after shearing, grinding, or milling to provide a Janus particle; wherein the Janus particle comprises the distinct first and second properties simultaneously; and
(D) introducing the Janus particles to a base fluid, wherein the Janus particles are insoluble in the base fluid; wherein the Janus particle comprises the distinct first and second properties prior to and during the introducing the Janus particle to the base fluid.

24. A wellbore treatment fluid comprises:
a base fluid; and a plurality of particles, wherein the plurality of particles comprises individual Janus particles, wherein the Janus particles comprise distinct first and second properties simultaneously, wherein the Janus particles are insoluble in the base fluid, wherein the Janus particles comprise:
(a) particle cores, wherein the cores have at least the first property;
(b) a coating around the outer surface of the cores or a modified surface of the cores, wherein the coating or surface has the second property, and wherein the second property is different from the first property, wherein the cores are exposed via grinding of the particles after coating or modification; wherein the first and second properties are selected from the group consisting of positive, negative and/or neutral charges; oil and water-wettability; wettability strengths; hydrophobicity and hydrophilicity; polar, intermediate polar and/or non-polar; polarity strengths; and any combination thereof.

25. The method according to claim 24, wherein the treatment fluid is used in an oil or gas operation, and wherein the treatment fluid is a drilling fluid, cement composition, spacer fluid, completion fluid, fracturing fluid, or acidizing fluid.

26. The method according to claim 24, wherein the cores are composed of metals, metal alloys, plastics, thermoplastics, ceramics, insoluble salts, oxides, composites, and any other insoluble materials.

27. The method according to claim 24, wherein the cores comprise a matrix having the first property and one or more particulates or fibers embedded within the matrix.

28. The method according to claim 27, wherein the one or more particulates or fibers have a third property, and wherein the third property is different from the first property of the matrix and the second property of the coating.

* * * * *